United States Patent
Warren et al.

(10) Patent No.: US 12,516,771 B2
(45) Date of Patent: Jan. 6, 2026

(54) TELESCOPING APPARATUS ADAPTED FOR OVERHEAD SUPPORT

(71) Applicant: JMJA Concepts LLC, Centennial, CO (US)

(72) Inventors: Neil James Warren, Centennial, CO (US); Scott Noble, Denver, CO (US)

(73) Assignee: JMJA Concepts LLC, Centennial, CO (US)

(*) Notice: Subject to any disclaimer, the term of this patent is extended or adjusted under 35 U.S.C. 154(b) by 31 days.

(21) Appl. No.: 18/534,514

(22) Filed: Dec. 8, 2023

(65) Prior Publication Data

US 2024/0191832 A1    Jun. 13, 2024

Related U.S. Application Data

(60) Provisional application No. 63/386,759, filed on Dec. 9, 2022.

(51) Int. Cl.
    *F16M 11/28*      (2006.01)
    *F16M 11/04*      (2006.01)

(52) U.S. Cl.
    CPC ........... *F16M 11/28* (2013.01); *F16M 11/041* (2013.01)

(58) Field of Classification Search
None
See application file for complete search history.

(56) References Cited

U.S. PATENT DOCUMENTS

| | | | | |
|---|---|---|---|---|
| 1,065,381 A | * | 6/1913 | Martin | A47K 1/09 211/65 |
| 1,093,405 A | * | 4/1914 | Hallen | B66F 15/00 254/130 |
| 2,214,440 A | * | 9/1940 | Rothery | B66F 3/30 254/93 H |
| 2,504,291 A | * | 4/1950 | Alderfer | E04G 25/061 248/354.3 |
| 2,684,222 A | * | 7/1954 | Miller | F16L 3/1218 248/354.3 |
| 2,823,958 A | | 2/1958 | Terry | |
| 2,938,595 A | | 5/1960 | Miller | |
| 3,393,768 A | | 7/1968 | Miller | |
| 4,119,044 A | * | 10/1978 | Hines | B62B 3/10 294/146 |
| 4,120,484 A | * | 10/1978 | Zimmer | E04F 21/1811 414/11 |

(Continued)

FOREIGN PATENT DOCUMENTS

CN    106276997 A    1/2017
CN    107235441 A    10/2017

*Primary Examiner* — Monica E Millner
(74) *Attorney, Agent, or Firm* — Kubota & Basol LLP

(57) ABSTRACT

A modularly reconfigurable apparatus for the use in the support, lifting, and/or installation of objects which are desired to be held overhead or in an elevated manner statically such as light fixtures, ceiling fans, wall cabinets, artwork, HVAC hardware, plumbing, and other objects which are commonly installed in an overhead location. The apparatus optionally provides a cradle for engagement with the object which requires support, optionally uses a telescoping mast, and optionally provides lateral stability through the use of support arms extending radially from the mast for engagement with existing structures.

19 Claims, 13 Drawing Sheets

(56) References Cited

U.S. PATENT DOCUMENTS

| | | | | |
|---|---|---|---|---|
| 4,141,526 A * | 2/1979 | John | B66F 3/08 | 254/DIG. 1 |
| 4,221,362 A * | 9/1980 | Van Santen | E04G 25/04 | 254/133 A |
| 4,300,751 A | 11/1981 | Delaney | | |
| 4,482,130 A * | 11/1984 | Paredes | B66F 15/00 | 254/8 R |
| 4,684,097 A * | 8/1987 | Cox | E04B 1/34336 | 248/354.3 |
| 4,695,028 A * | 9/1987 | Hunter | E04F 21/1805 | 248/354.1 |
| 4,715,760 A * | 12/1987 | Browning | B66F 3/24 | 254/93 H |
| 4,738,369 A * | 4/1988 | Desjardins | F16M 11/18 | 211/208 |
| 4,803,606 A * | 2/1989 | Rotter | F21S 6/003 | 362/249.11 |
| 5,126,928 A * | 6/1992 | Hughes | F16M 11/42 | 362/427 |
| 5,129,774 A * | 7/1992 | Balseiro | E04F 21/1805 | 248/354.1 |
| 5,160,125 A * | 11/1992 | Jenkins | F16M 11/2021 | 269/50 |
| D348,340 S * | 6/1994 | Collins, Jr. | D34/28 | |
| 5,400,994 A * | 3/1995 | Shawwaf | E21D 15/22 | 248/548 |
| D361,420 S * | 8/1995 | Riek | D34/21 | |
| 5,458,306 A * | 10/1995 | O'Farrill | F16M 13/04 | 396/420 |
| 5,549,499 A * | 8/1996 | Foskey | A63H 3/50 | 446/268 |
| 5,557,877 A * | 9/1996 | Colson | A01K 97/10 | 248/512 |
| 5,588,630 A * | 12/1996 | Chen-Chao | F16C 11/10 | 248/514 |
| 5,685,107 A * | 11/1997 | Sweet | A01K 97/10 | 43/21.2 |
| 5,732,527 A * | 3/1998 | Schneider | E04F 21/1822 | 52/749.1 |
| 5,746,334 A * | 5/1998 | Brandenberg | A47B 9/14 | 211/205 |
| 5,758,854 A * | 6/1998 | Shih | E04G 25/063 | 248/354.3 |
| 5,819,482 A * | 10/1998 | Belke | E04G 25/06 | 248/354.3 |
| 5,906,284 A * | 5/1999 | Hammerstrom | B25H 1/02 | 211/205 |
| 6,139,450 A * | 10/2000 | Rivers | A63B 69/0002 | 473/422 |
| 6,234,440 B1* | 5/2001 | Boney | A47H 7/00 | 248/354.1 |
| 6,244,810 B1* | 6/2001 | Reyes | E04F 21/1811 | 414/11 |
| 6,273,662 B1* | 8/2001 | Fleckenstein | F16M 11/28 | 248/371 |
| 6,345,864 B1* | 2/2002 | Rivera | A47D 13/00 | 297/130 |
| 6,419,511 B2* | 7/2002 | Lizell | A47B 21/06 | 439/210 |
| 6,439,515 B1* | 8/2002 | Powers | F16M 13/04 | 248/129 |
| 6,505,803 B1* | 1/2003 | Hernandez | A47B 51/00 | 248/354.3 |
| 6,612,533 B2* | 9/2003 | Biles | E04F 21/00 | 248/125.3 |
| 6,749,073 B2* | 6/2004 | McNab | A47G 25/0671 | 211/205 |
| 7,152,833 B1* | 12/2006 | Pitsenbarger | A47B 97/00 | 248/419 |
| 7,810,767 B1* | 10/2010 | Harris | A61B 90/60 | 248/118.1 |
| 7,891,716 B2* | 2/2011 | Orr | B25B 27/00 | 294/99.1 |
| 8,240,488 B2* | 8/2012 | Huang | B05B 13/0292 | 211/107 |
| 8,662,324 B2* | 3/2014 | Robinson | A61J 9/0684 | 211/126.5 |
| 8,967,555 B2* | 3/2015 | Smith | F16L 3/00 | 248/68.1 |
| D736,016 S * | 8/2015 | Gelissen | D6/682 | |
| 9,188,277 B2* | 11/2015 | VanOrden | F16M 13/02 | |
| 9,334,663 B2* | 5/2016 | Galvez | E04F 21/1811 | |
| 9,347,196 B2* | 5/2016 | Wagler | E02D 27/42 | |
| 9,492,020 B1* | 11/2016 | Morrell | A47F 5/10 | |
| 10,378,680 B2* | 8/2019 | Anderson | F16L 3/20 | |
| 10,774,522 B1* | 9/2020 | Bradford | E04G 21/1891 | |
| 10,896,774 B2* | 1/2021 | Stilwell | H02G 3/30 | |
| 11,927,300 B2* | 3/2024 | Eccard | E04H 12/2269 | |
| 2003/0137847 A1* | 7/2003 | Cooper | F21V 21/088 | 362/418 |
| 2007/0274817 A1* | 11/2007 | Chepurny | A61H 3/008 | 414/749.1 |
| 2008/0142667 A1* | 6/2008 | German | A47B 97/04 | 248/447.1 |

* cited by examiner

SECTION A-A

DETAIL B-B

SECTION A-A

SECTION A-A

TELESCOPING APPARATUS ADAPTED FOR OVERHEAD SUPPORT

CROSS-REFERENCE TO RELATED APPLICATION

This application claims the benefit of U.S. Provisional Patent Application No. 63/386,759 entitled "TELESCOPING APPARATUS ADAPTED FOR OVERHEAD SUPPORT" filed on Dec. 9, 2022, the entire contents of which is incorporated herein by reference in its entirety for all purposes.

FIELD OF THE INVENTION

The present invention is directed to a telescoping apparatus intended for use in the vertical support of lighting fixtures, HVAC hardware, plumbing, and other construction elements which are commonly installed in an overhead location.

BACKGROUND OF THE INVENTION

The installation of construction elements, such as light fixtures, are commonly installed overhead and often on a ladder. When an individual installs a light fixture, the support of the light fixture is critical to a safe and effective installation without risk of dropping the light fixture.

When larger light fixtures, or those that incorporate glass are involve, the risk and associated consequence of dropping the light fixture are higher as dropping the light fixture can result in damage to the light fixture, damage to the floor below, or potentially result in the installer falling from a structure such as a ladder that he/she may be standing upon and thus risking injury or even death.

In certain scenarios, an installer may attempt to suspend the light fixture by way of hanging the light fixture from electrical wires which have been twisted together and secured by wiring nuts which are intended for electrical connections and have not been designed for supporting a tensile load. Such practice may result in damage to the wiring connections of the light fixture, or damage to the wiring connections of the structure. Furthermore, the electrical connections are not rated for load bearing use, wherein the light fixture may suddenly disconnect from the electrical connections under its own suspended weight and fall to the ground risking damage to the fixture and potentially harming personnel located below the fixture.

There is an identified need to provide a stable and safe support structure for the mounting of light fixtures and similar to overhead locations such as on ceiling and wall structures.

SUMMARY OF THE INVENTION

It is an aspect of certain embodiments of the present disclosure to provide an extendable support apparatus intended for use when installing overhead objects such as a light fixture to a ceiling. Certain embodiments of the present disclosure comprise a telescoping mast interconnected with a base. The base allows a user to modularly interconnect legs thereto, wherein the legs are angularly interspaced around a mast to construct a base appropriate for the task. For instance, a larger object such as a ceiling fan which needs support and/or an item that requires support at a higher height may require the use of a base having a larger footprint to maintain proper support and prevent the tipping of the apparatus when supporting the light fixture or other object being installed. While the present disclosure is intended for the use with the installation of construction related objects, such as light fixtures, electrical devices, electrical conduit, and HVAC related devices, the use of the disclosure disclosed herein is not limited thereto.

It is an aspect of certain embodiments of the present disclosure to provide an extendable support apparatus which is easily transportable. In certain embodiments the present disclosure comprises a base configured to be removably interconnected with the mast. The base comprises a plurality of sockets configured to slidably receive legs therein. The legs when interconnected with the sockets result in the legs extending radially away from a central axis of the mast. A user may desire to use shorter legs for smaller objects for installation nearer to the ground, while a user may desire to use legs having a longer length, thus providing a larger footprint for the support of a larger object for installation further from the ground. The higher a device for installation must be supported, the larger the footprint may be desired. As an object extends above the base, the higher the center of gravity rises, and thus the critical angle decreases. The "critical angle", as used herein, refers to the angle required for the center of gravity to shift horizontally beyond an extent of the footprint of the base wherein the extendable mast would thereby tip and fall over. The increasing of the footprint size serves to increase the critical angle, as would the reduction of height of the extendable support, thus providing increased support and rendering a safer situation for overhead installation.

In certain embodiments, the legs are pivotally interconnected with the base, allowing a user to lock the legs in a standing configuration wherein the apparatus is able to stand in an upright orientation. Furthermore, certain embodiments allow the legs to be locked in a collapsed configuration wherein the legs are about parallel with the mast for ease of transport or stowage. In certain embodiments it may be desired to allow the locking of the legs at a plurality of angles from the mast, wherein an increase of the angle between the mast and the legs results in a larger supporting footprint.

In certain embodiments it may be desired to use legs which have a telescoping or extendable feature wherein the length of the legs are adjustable and can be adapted for a variety of situations.

Certain embodiments of the present disclosure comprise a cradle configured to support an object for installation, wherein the cradle is removably interconnected to a telescoping mast. In certain embodiments, the mast comprises a telescoping aspect wherein the mast can be locked in a plurality of heights to suit the required height of the support apparatus. In certain embodiments, incremental height adjustments are made possible by interconnecting the cradle to the mast with a threaded connection wherein the cradle comprises a male threaded feature and the mast comprises a female threaded feature configured to intermesh with the male threaded feature. Thus, the rotation of the cradle or of the female threaded features allows the raising and lowering of the cradle.

It is an aspect of certain embodiments of the present disclosure to provide support for objects intended to be installed on a horizontal surface overhead, a vertical surface, or an angled surface comprising an angle between vertical and horizontal, such as a vaulted ceiling. In certain embodiments, the present disclosure comprises an articulating joint between the telescoping mast and the cradle of the extendable support apparatus. The articulating joint allows a user to selectively rotate the cradle of the extendable support to provide support in a horizontal plane, a vertical plane, or any plane therebetween.

It is an aspect of certain embodiments of the present disclosure to provide a cradle wherein an object, such as a light fixture, sconce, or other object rests within the cradle for support during installation overhead. The cradle as disclosed herein provides for a concave or recessed aspect wherein the length of the envelope, the width of the envelope, and the depth of the concavity are configured to be adjustable. Furthermore, in certain embodiments, a plurality of cradle arms which extend radially away from the cradle of the extendable support define the envelope of the cradle.

It is an aspect of certain embodiments of the present disclosure to provide a cradle having non-marring characteristics to provide support without damage to a supported device, and to provide additional grip for preventing the device from slipping out of the cradle. In certain embodiments the cradle arms comprise a rubberized layer wherein the rubber provides a non-marring interface with the object for installation, and simultaneously increases friction between the cradle and the supported device to reduce the possibility of it slipping out of the cradle.

It is an aspect of certain embodiments to provide a base-plate supports the mast in an upright configuration wherein the mast is able to be interconnected to the base plate at the center of the base-plate for supporting objects in a free-standing configuration. It is a further aspect of certain embodiments to allow the mounting of the mast proximal to an edge of the base-plate to allow the support of a wall-mounted object such as a wall sconce, cabinet, picture, or other wall-mounted object.

In certain embodiments, the base-plate comprises a dimensional form which allows the base-plate to be fully supported on a stair-tread, such as a stair-tread with a width of 36 inches wide, and 10 inches deep.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either limit the inclusion or non-inclusion of elements, components, etc. in this Summary. Additional aspects of the present invention will become more readily apparent from the detailed description, particularly when taken together with the drawings, and the claims provided herein.

DETAILED DESCRIPTION OF VARIOUS EMBODIMENTS

Figure 1:
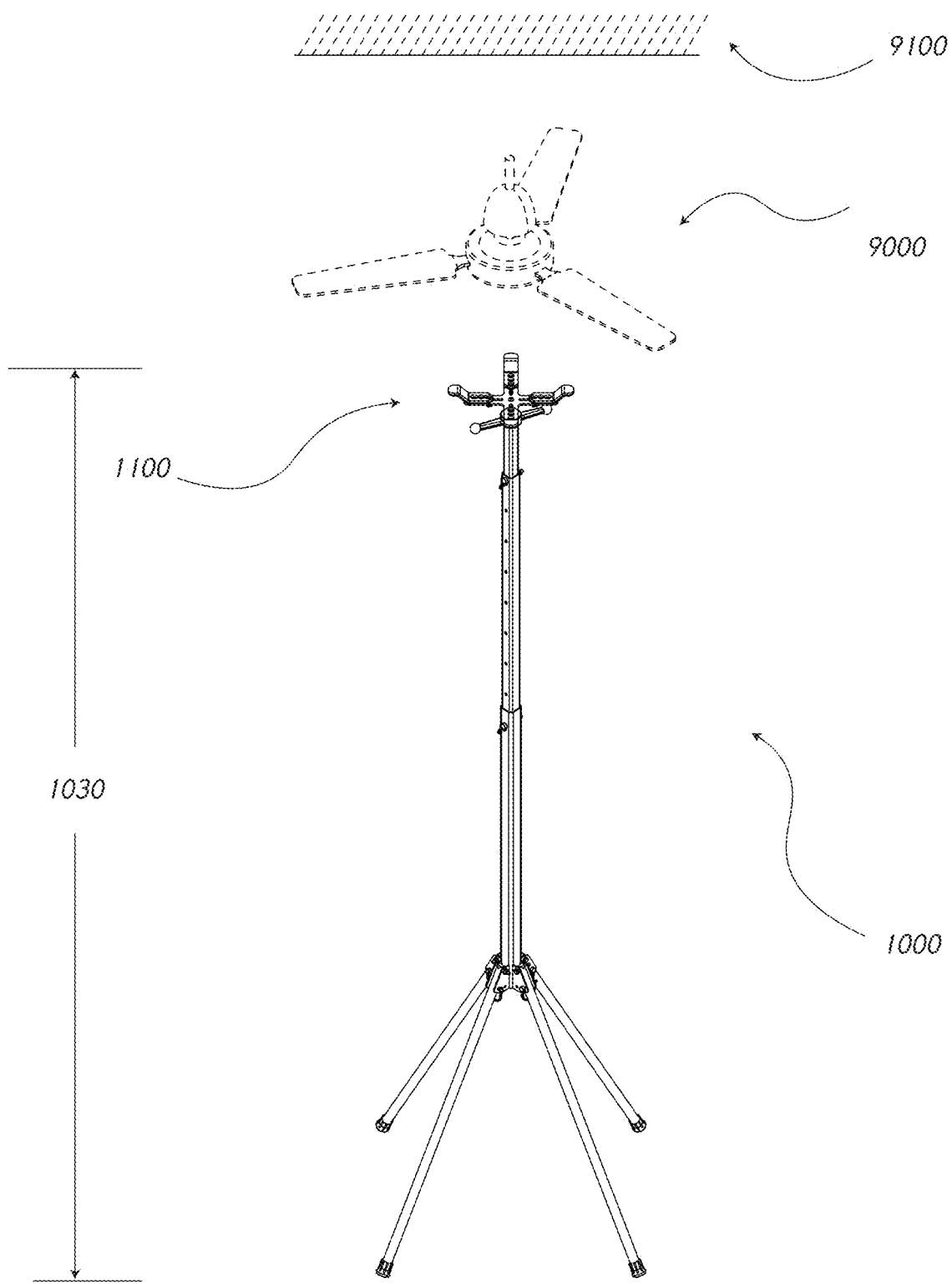
FIG. 1—A perspective view of certain embodiments of an apparatus of the present disclosure in use FIG. 2A—A side view of certain embodiments of an apparatus of the present disclosure FIG. 2B—A partial side section view of the apparatus shown in FIG. 2A FIG. 3—A partial side view of certain embodiments of an apparatus of the present disclosure FIG. 4—A partial perspective view of certain embodiments of an apparatus of the present disclosure FIG. 5—A perspective view of certain embodiments of an apparatus of the present disclosure FIG. 6A—A side view of certain embodiments of an apparatus of the present disclosure in a standing configuration FIG. 6B—A detail view of the apparatus as shown in FIG. 6A FIG. 7—A partial perspective view of certain embodiments of an apparatus of the present disclosure FIG. 8A—A side view of certain embodiments of an apparatus of the present disclosure in a collapsed configuration FIG. 8B—A side view of certain embodiments of an apparatus of the present disclosure in an alternate collapsed configuration FIG. 9A—A perspective view of certain embodiments of an apparatus of the present disclosure FIG. 9B—A perspective view of certain embodiments of an apparatus of the present disclosure FIG. 10A—A front view of certain embodiments of an apparatus of the present disclosure FIG. 10B—A partial cross-sectional view of the embodiment shown in FIG. 10A, showing a carriage lock in a locked configuration FIG. 10C—A partial cross-sectional view of the embodiment shown in FIG. 10A, showing a carriage lock in an unlocked configuration FIG. 11A—A front view of certain embodiments comprising a carriage lock FIG. 11B—A perspective view of certain embodiments comprising a carriage lock FIG. 11C—A perspective view of certain embodiments comprising a carriage lock

In certain embodiments, as shown in FIG. 1-FIG. 4 for instance, an overhead support apparatus 1000 comprises a cradle 1100 comprising a recessed aspect 1105 adapted for receiving objects therein such as a light fixture 9000 or other objects which may be desired to mount to a ceiling 9100 or wall surface. In certain embodiments the cradle 1100 comprises a plurality of cradle arms 1130 interconnected to a central hub 1140 wherein the cradle arms 1130 extend radially outward and upward away from the central hub 1140. Each of the plurality of the cradle arms 1130 are radially adjustable wherein the length 1135 of each cradle arm can be extended outward, or retracted inward to adjust the cradle 1100 as desired.

In certain embodiments the extension and retraction of the cradle arms 1130 comprises the use of threaded fasteners 1150 to lock the cradle arm 1130 in the desired configuration. While embodiments are shown comprising threaded features 1150 (e.g., threaded fasteners) to enable the extension and retraction of the cradle arms 1130 in relation to the central hub 1140, alternate embodiments comprising alternate strategies for the extension and retraction of the cradle arms 1130 are with in the spirit and scope of the present disclosure. For instance, alternate embodiments comprising a telescoping cradle arm 1130 are within the spirit and scope of the present disclosure.

In certain embodiments, the cradle arms 1130 comprise a non-marring surface 1155 wherein the non-marring surface 1155 is adapted for interfacing with fragile materials without scratching or otherwise marring the surface. Various non-marring materials are within the spirit and scope of the present disclosure including polyurethane, silicone, rubber, urethane, polymeric compounds, and a combination of any of the aforementioned materials.

In certain embodiments, as shown in FIG. 1-FIG. 4 for instance, the cradle 1100 is mounted to the top of a mast 1200. In certain embodiments the interconnection between the cradle 1100 and the mast 1200 comprises male threaded feature 1160 having a first end 1161 interconnected to the central hub 1140, and a second end 1162 extending downward away from the central hub 1140. The female threaded feature 1260 is interconnected to the top 1210 of the mast. The female threaded feature 1260 and the male threaded feature 1160 are configured to intermesh wherein the rotation of the collar 1240 in relation to the mast 1200 in a first direction 1261 results in the extension of the cradle 1100 in relation to the mast 1200, and the rotation of the collar 1240 in a second direction 1262 in relation to the mast 1200 results in the retraction of the cradle 1100 in relation to the mast 1200. Thus, the rotation of the female threaded feature 1260 in relation to the male threaded feature 1160 results in the adjustment of the height 1030 of the apparatus as desired. In certain embodiments the mast 1200 comprises a hollow aspect 1230 wherein the male threaded feature 1160, when intermeshed with the female threaded feature 1260, extends into the hollow aspect 1230 of the mast.

Figure 2A:
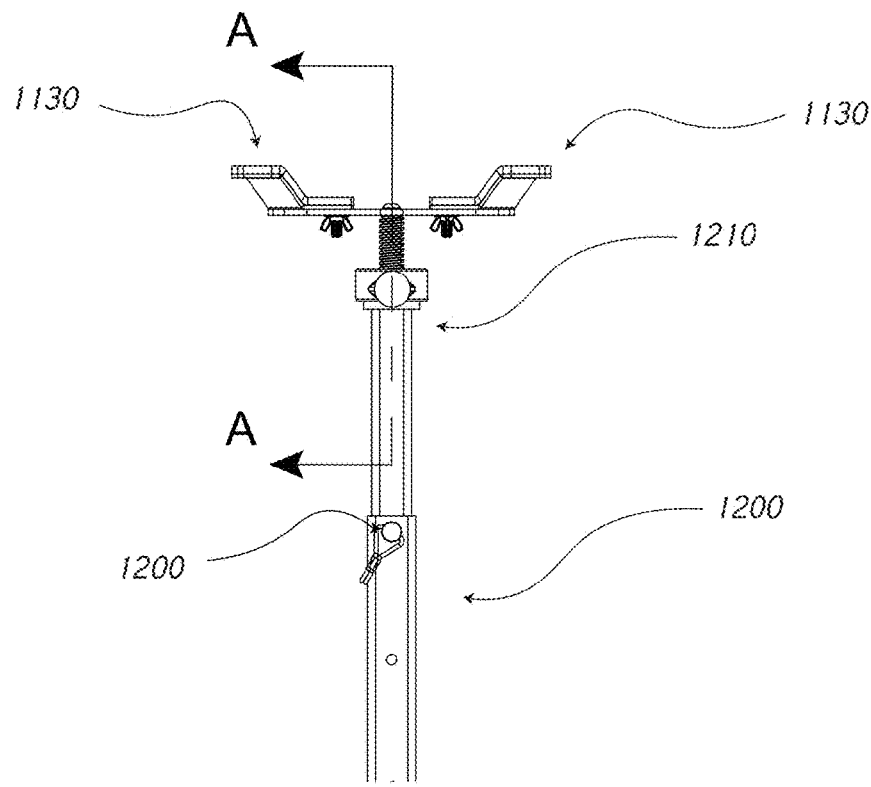
Figure 2B:
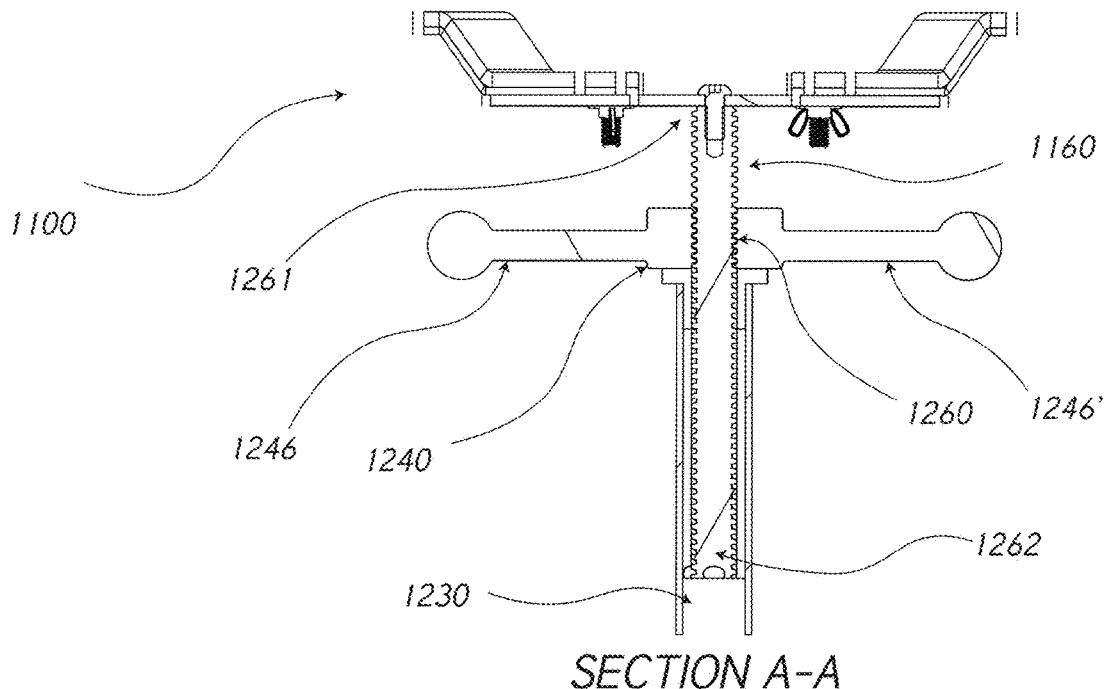
Figure 3:
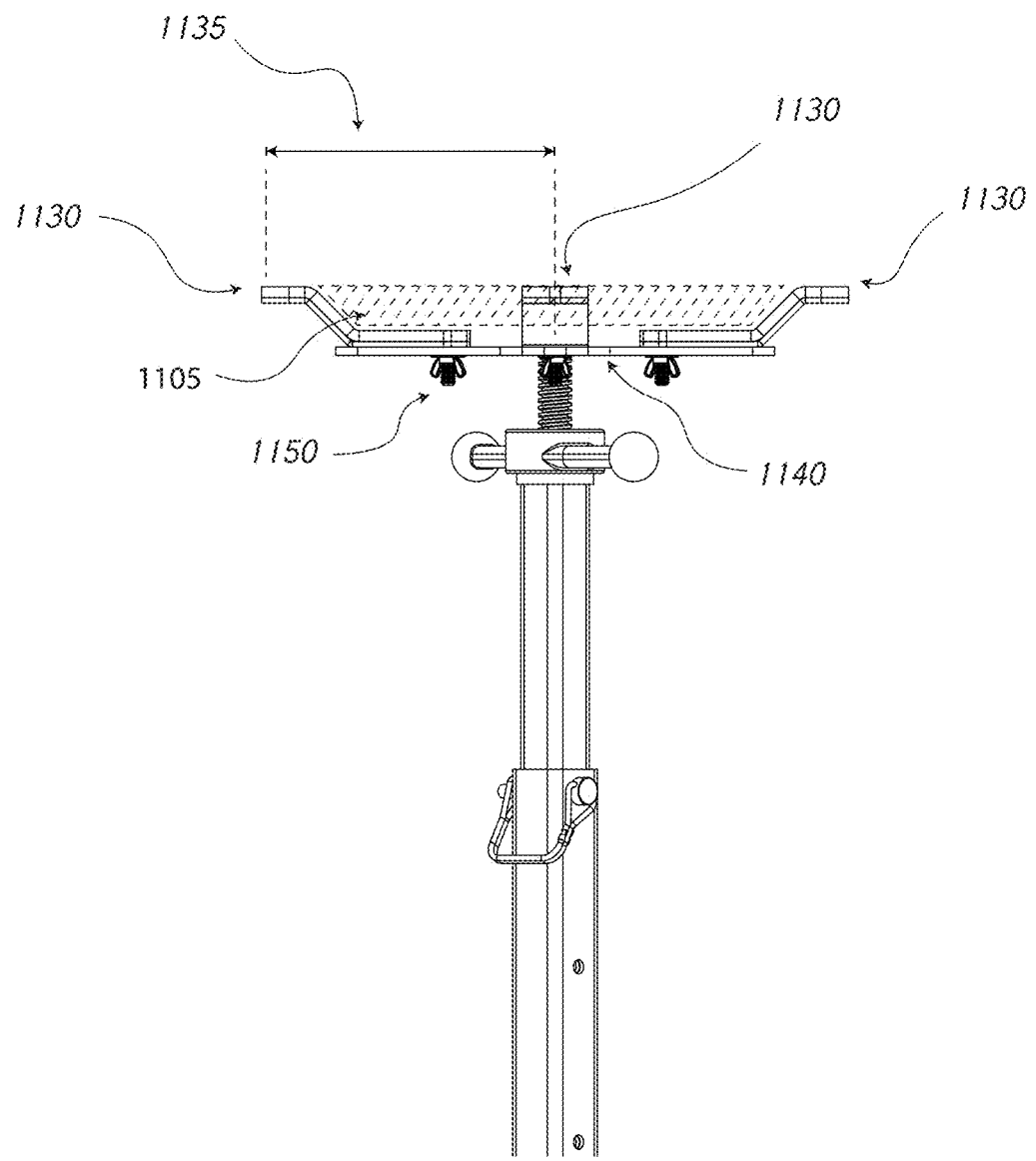
Figure 4:
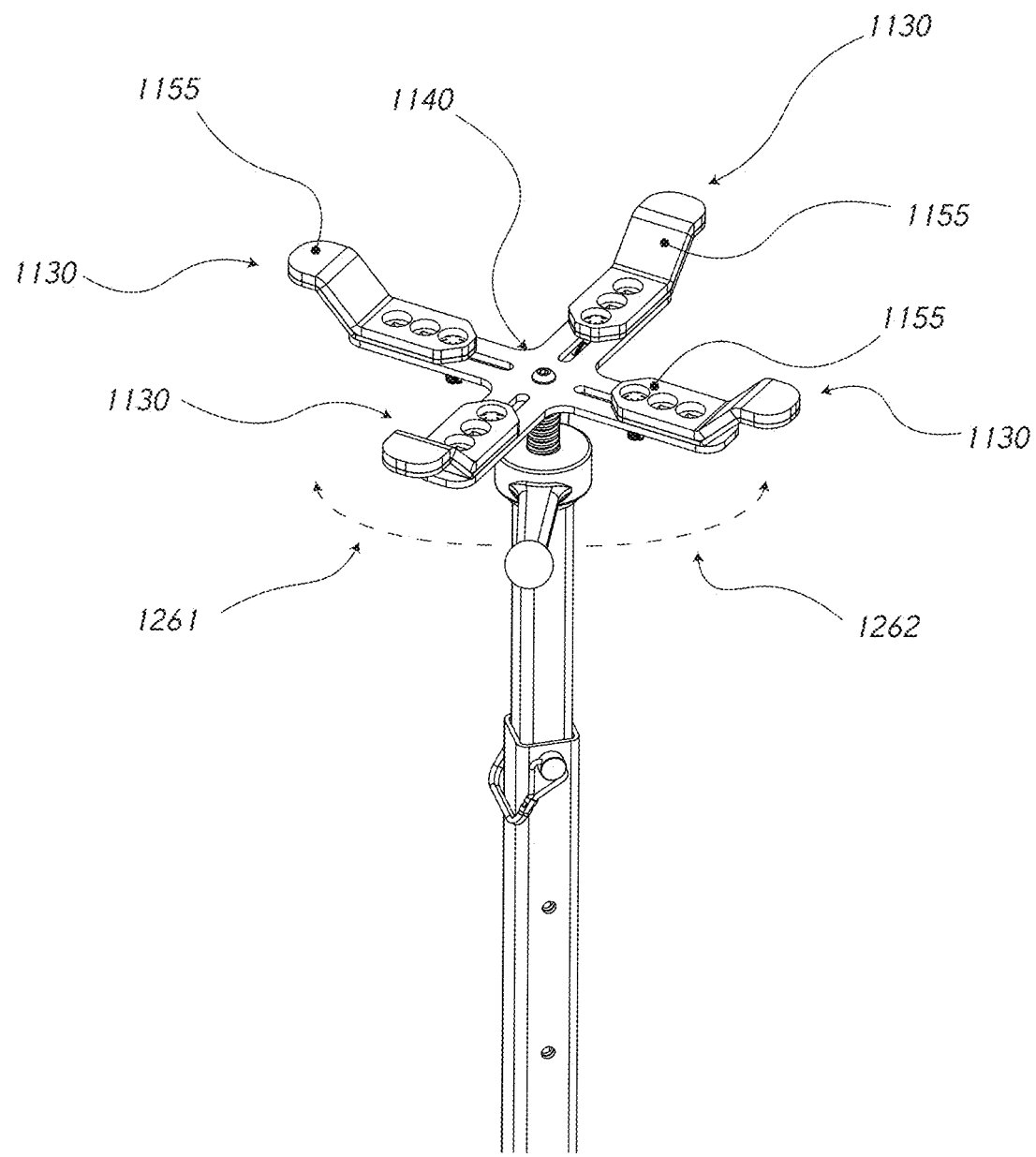

In certain embodiments, as shown in FIG. 2A—FIG. 2B for instance, a collar 1240 comprises the female threaded feature 1260 wherein the collar 1240 provides extensions 1246 extending outward from the female threaded feature 1260 adapted for providing increased leverage for the case of adjustment of the height 1030. In certain embodiments the collar 1240 comprises a first extension 1246 and a second extension 1246' extending radially outward from the collar 1240, wherein the extensions 1246, 1246' are 180-degrees opposed to each other.

Figure 5:
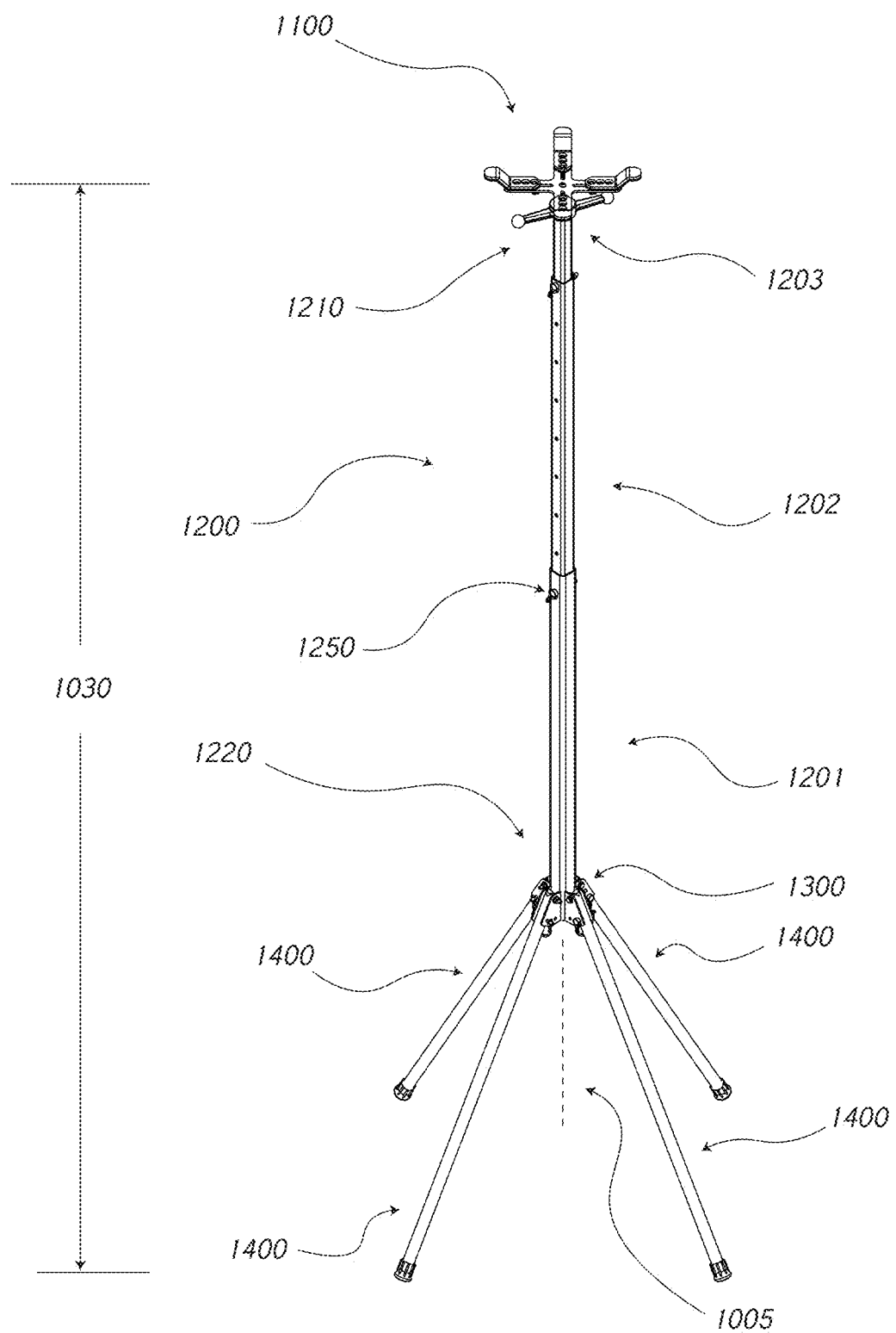

In certain embodiments, as shown in FIG. 5 for instance, the mast 1200 comprises a telescoping function wherein the mast 1200 can be extended and retracted as desired to allow the adjustment of the height 1030 of the apparatus 1000 to a desired height. In certain embodiments the mast 1200 comprises a first segment 1201, a second segment 1202, and a third segment 1203. The first segment 1201 is interconnected to a base 1300 at the bottom end 1220 of the mast, and the cradle is interconnected to the third segment 1203 at the top 1210 of the mast. The second segment 1202 is slidably interconnected with the first segment 1201, wherein the second segment 1202 can be extended or retracted in relation to the first segment 1201. Furthermore, the second segment 1202 can be locked in position in relation to the first segment 1201. Further still, in certain embodiments the third segment 1203 is slidably interconnected with the second segment 1202, wherein the third segment 1203 can be extended or retracted in relation to the second segment 1202. Further still, the third segment 1203 can be locked in a position in relation to the second segment 1202. In certain embodiments the segments are locked in position in relation to each other as shown for example, with a through-pin 1250. While through-pins 1250 are shown, embodiments comprising alternate mechanisms for locking the segments in position are within the spirit and scope of the present disclosure. For instance, embodiments comprising a twist-lock, step-loc, lever-lock, button-pins, or other mechanisms for the position locking of telescoping elements are within the spirit and scope of the present disclosure.

Figures 6A, 6B:
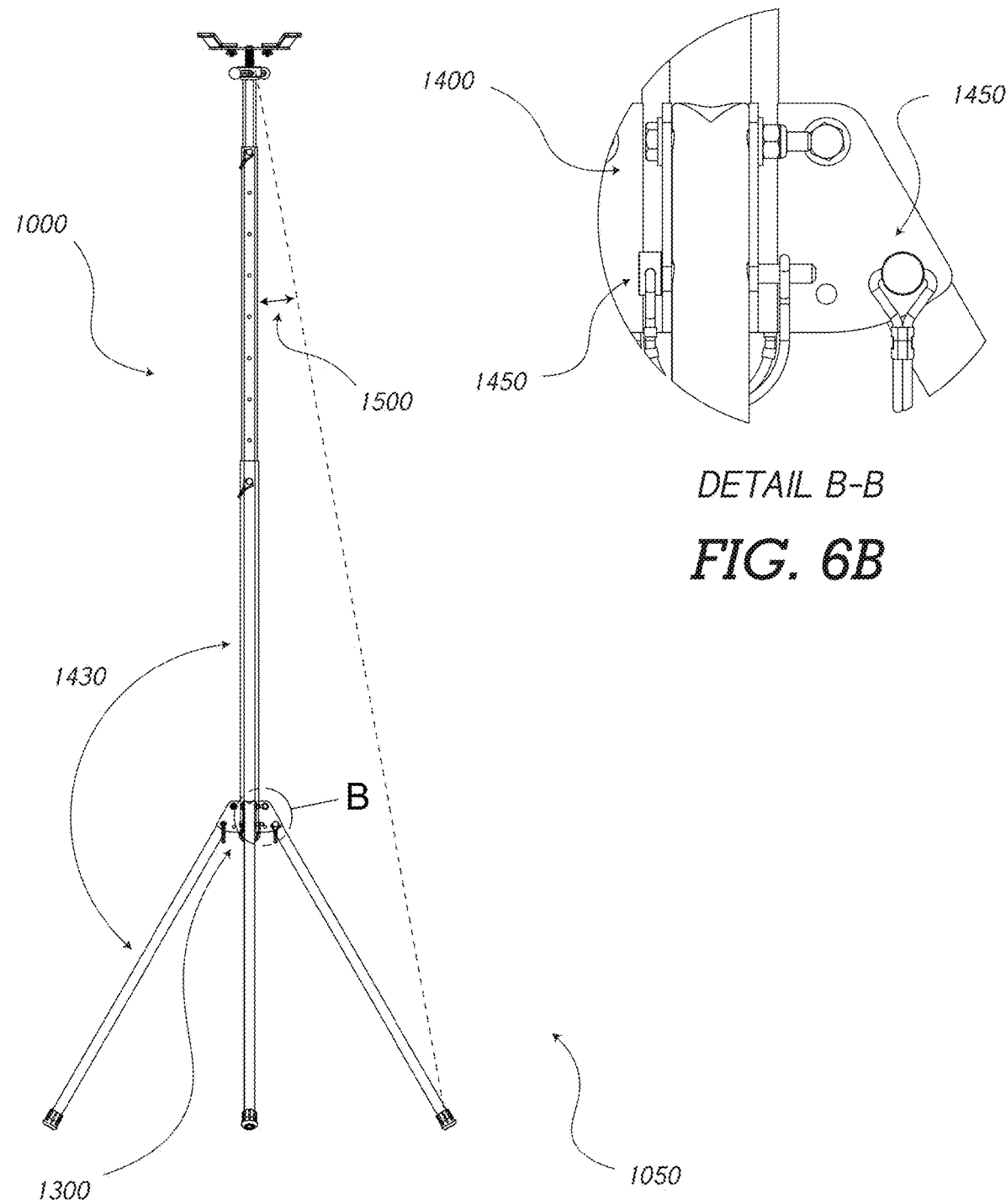
Figure 7:
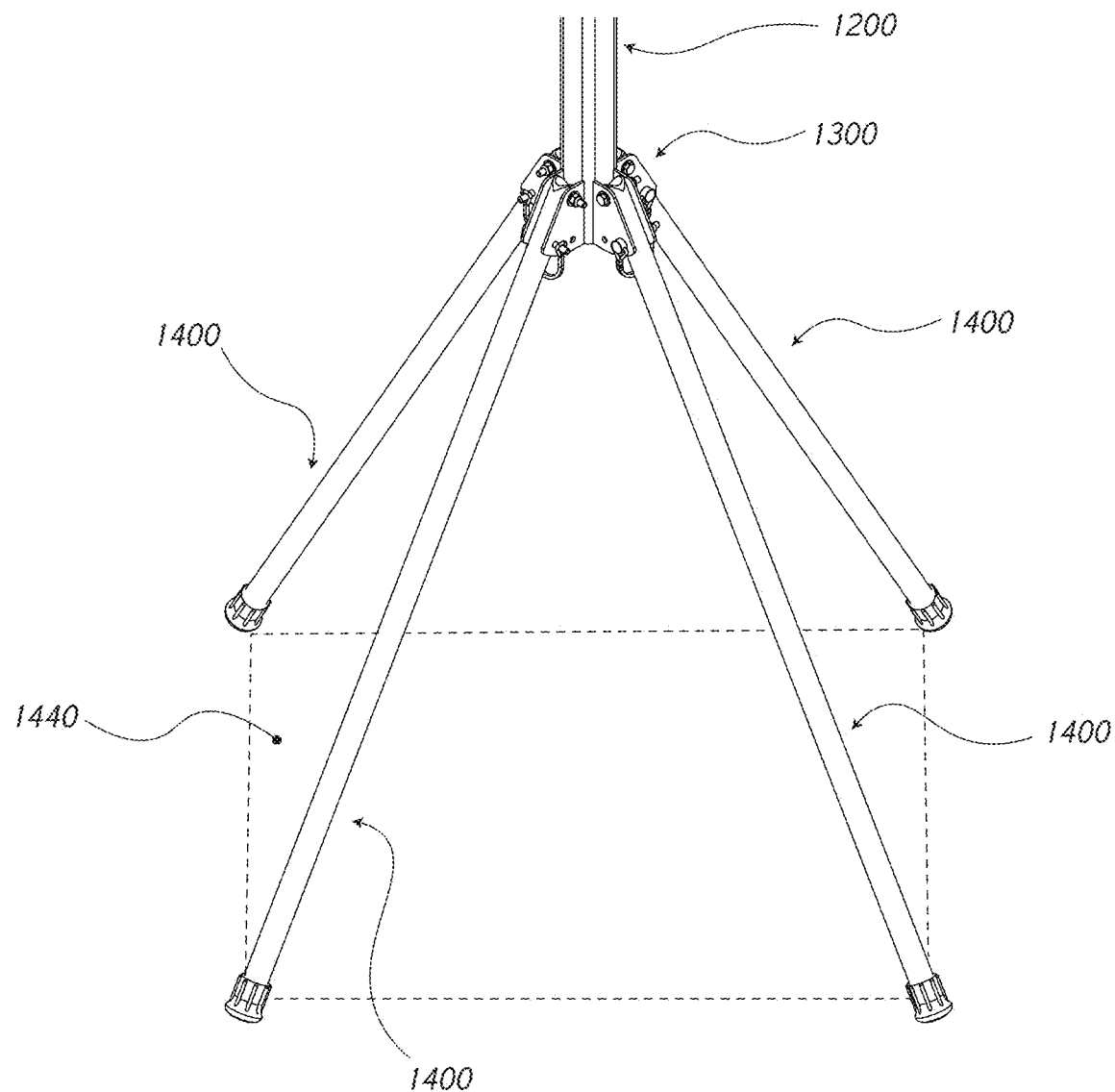

In certain embodiments, as shown in FIG. 5-FIG. 7 for instance, the mast 1200 comprises a base 1300 interconnected to the bottom end 1220 of the mast. The base 1300 comprises legs 1400 interconnected thereto wherein the legs 1400 provide support for the apparatus 1000 in a standing configuration 1050. In certain embodiments the legs 1400 are pivotally interconnected with the base 1300 wherein the legs 1400 are able to rotate between parallel with the central axis 1005 of the mast, and 90-degrees opposed to the central axis 1005. In certain embodiments, the legs 1400 are configured to be locked in a first standing configuration 1050 wherein the legs 1400 are disposed at an angle 1430 of less than 180-degrees and equal to, or greater than 90-degrees from the mast 1200. In certain embodiments, as shown, it may be desired to lock the legs at 120-degrees from the mast, however embodiments disclosed herein are not limited thereto. In certain embodiments wherein a larger footprint 1440 is desired, the legs 1400 can be locked at an angle 1430 closer 90-degrees from the mast.

In certain embodiments it may be desired to have the legs 1400 locked at an angle 1430 closer to 90-degrees to provide a maximized footprint 1440. For instance, when an object is mounted higher, the critical angle 1500 reduces. As the critical angle 1500 reduces, the chance of tipping rises. Thus, in such situations, it may be desired to use longer legs 1400 to provide a larger and more stable footprint 1440 for the support of the object.

Figure 8A:
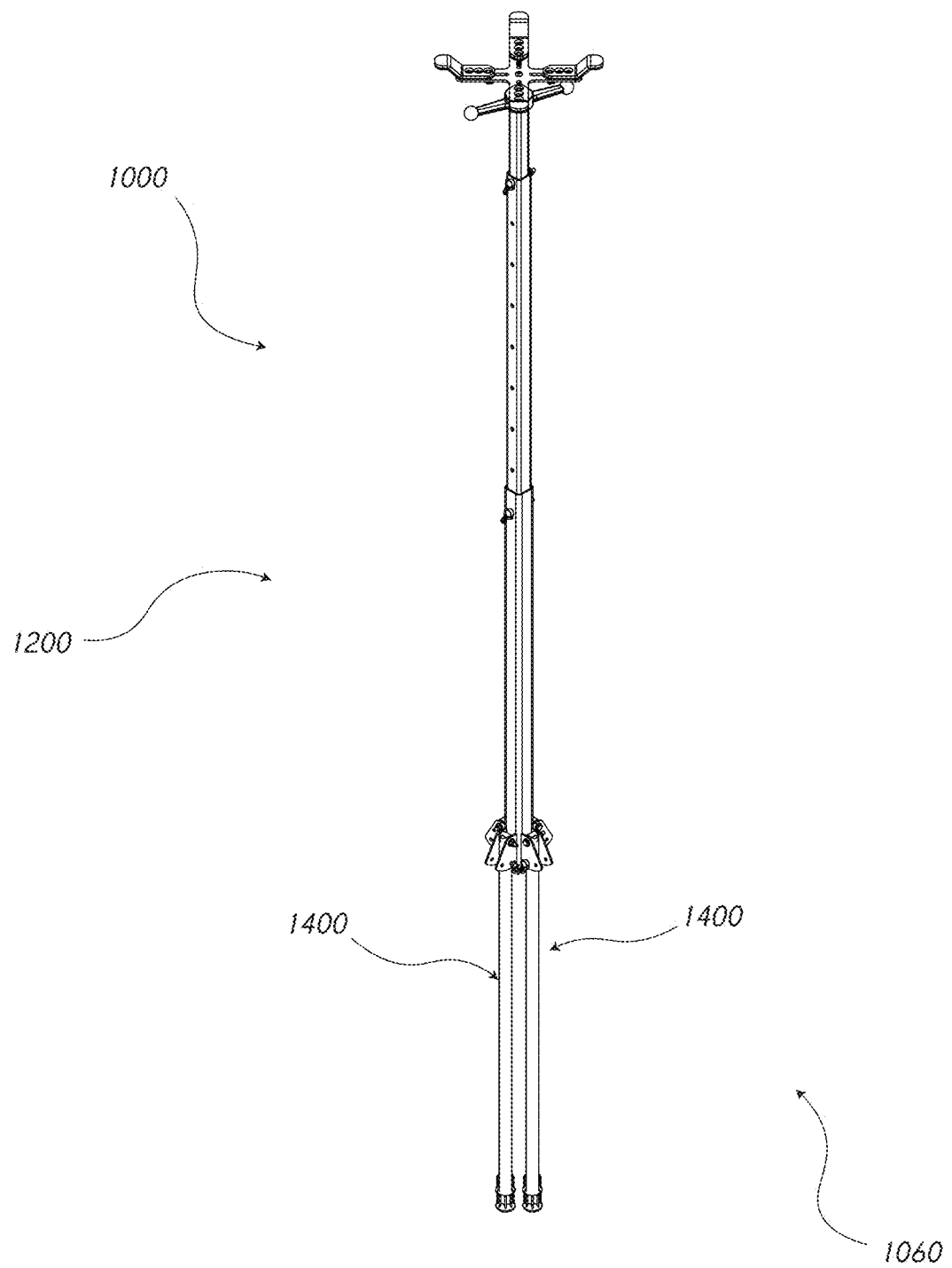
Figure 8B:
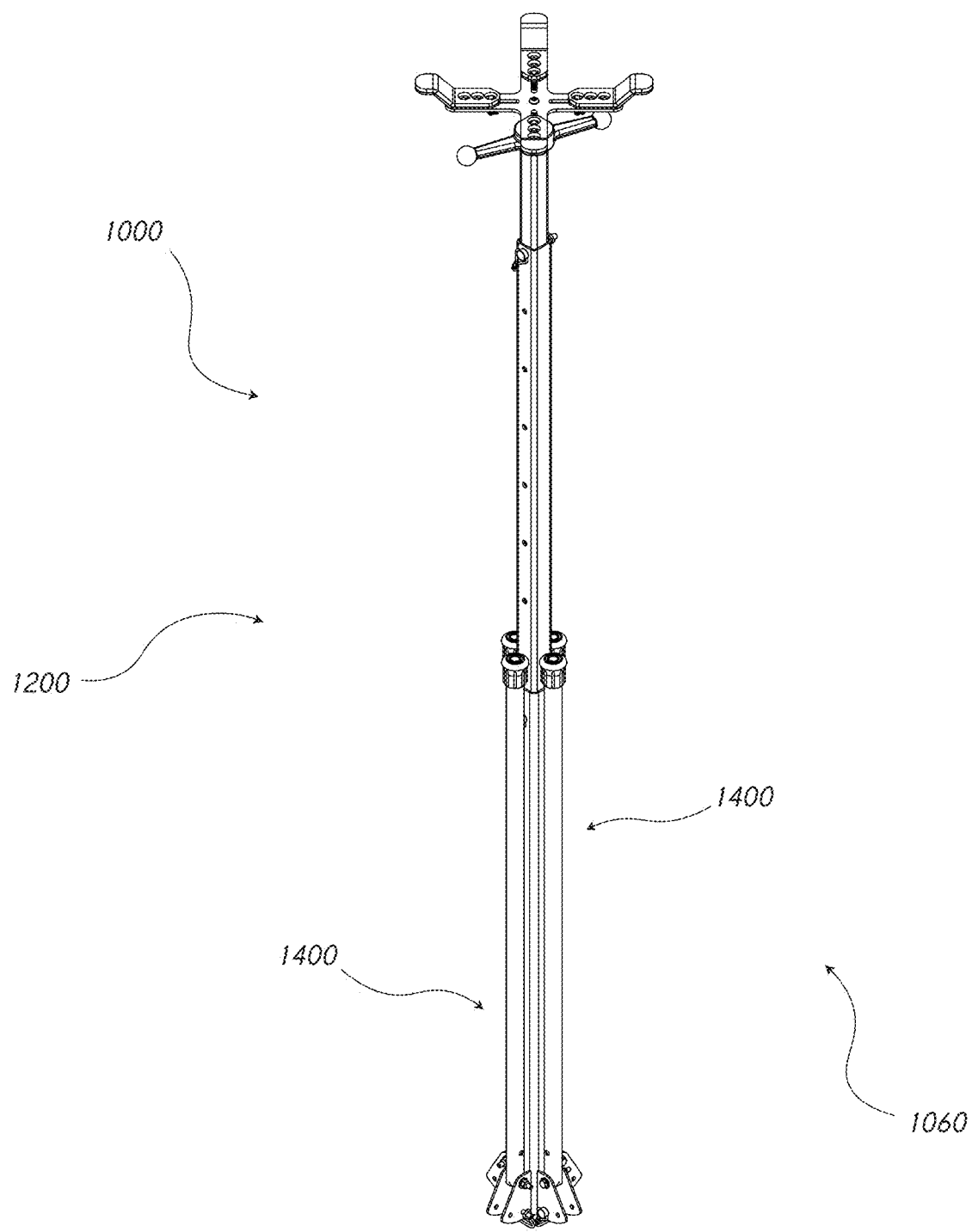

In certain embodiments the legs, as shown in FIG. 8A-FIG. 8B for instance, 1400 may be desired to be locked parallel to the mast 1200 in a collapsed configuration 1060. The legs 1400 locked parallel or about parallel to the mast allows the compact carrying and storage of the apparatus 1000. While the legs 1400 are locked parallel to the mast at 180-degrees or about 180-degrees as shown in certain embodiments such as FIG. 8A, alternate embodiments wherein the legs 1400 are locked at 0-degrees or about 0-degrees from the mast 1200, as seen in FIG. 8B, are within the spirit and scope of the present disclosure.

In certain embodiments, as shown in FIG. 6A-FIG. 8, the legs 1400 are locked in position as shown for example, with a through-pin 1450. While through-pins 1450 are shown, embodiments comprising alternate mechanisms for locking the segments in position are within the spirit and scope of the present disclosure. For instance, embodiments comprising a step-loc, lever-lock, button-pins, or other mechanisms for the position locking of telescoping elements are within the spirit and scope of the present disclosure.

In certain embodiments, as shown in for instance, the base comprises a plurality of sockets configured to receive legs slidably therein. In such embodiments, the legs are slidably interconnected with the base to allow a user to establish a base footprint suitable for the weight of the object requiring support and the height at which it needs to be mounted. In certain embodiments the legs are locked within the sockets with a through-pin. Furthermore, in certain embodiments the mast is removably interconnectable with the base wherein the mast is inserted within a socket, wherein the mast is locked in place with a through-pin. While through-pins are shown, embodiments comprising alternate mechanisms for locking the segments in position are within the spirit and scope of the present disclosure. For instance, embodiments comprising a step-loc, lever-lock, button-pins, or other mechanisms for the position locking of telescoping elements are within the spirit and scope of the present disclosure.

Figure 9A:
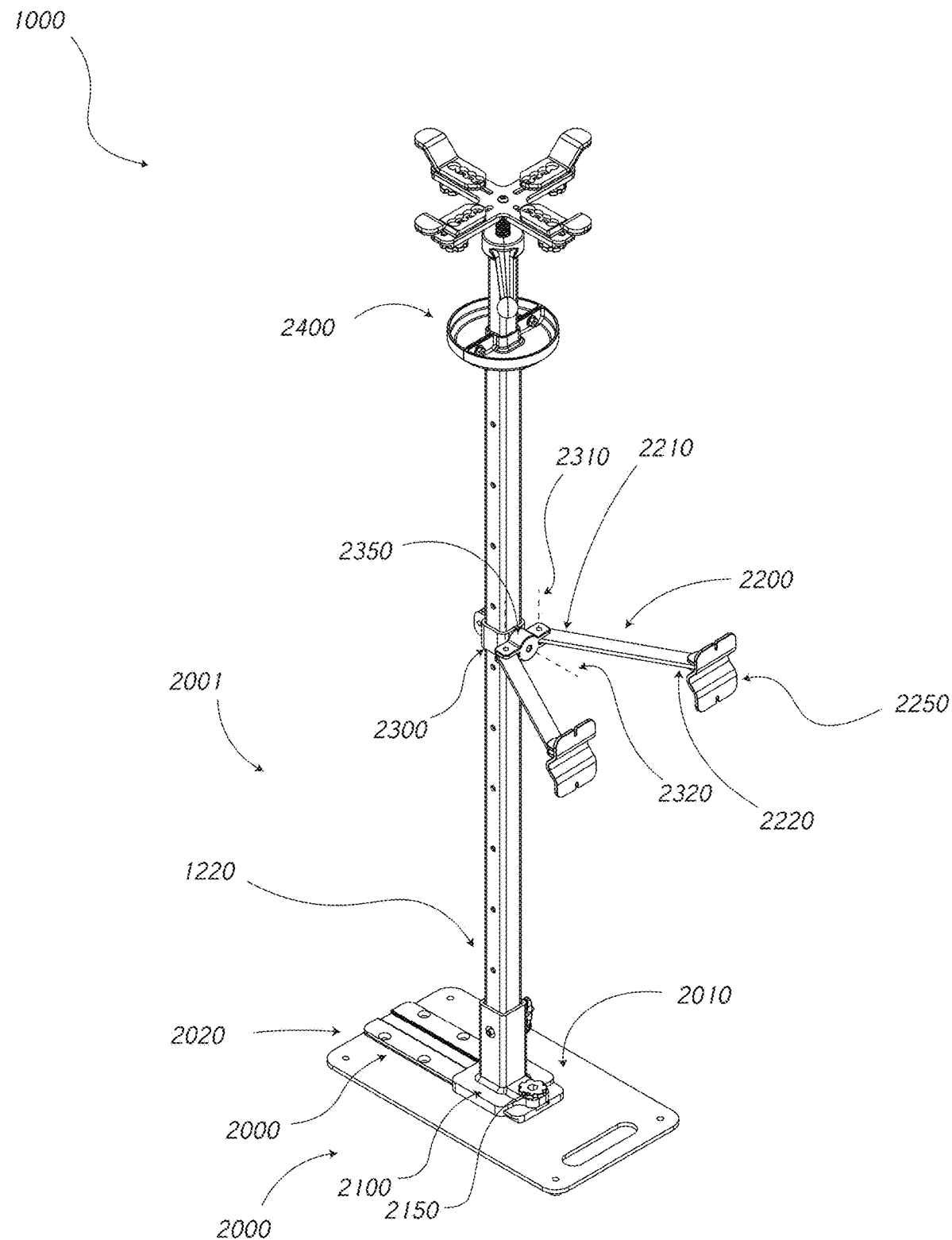
Figure 9B:
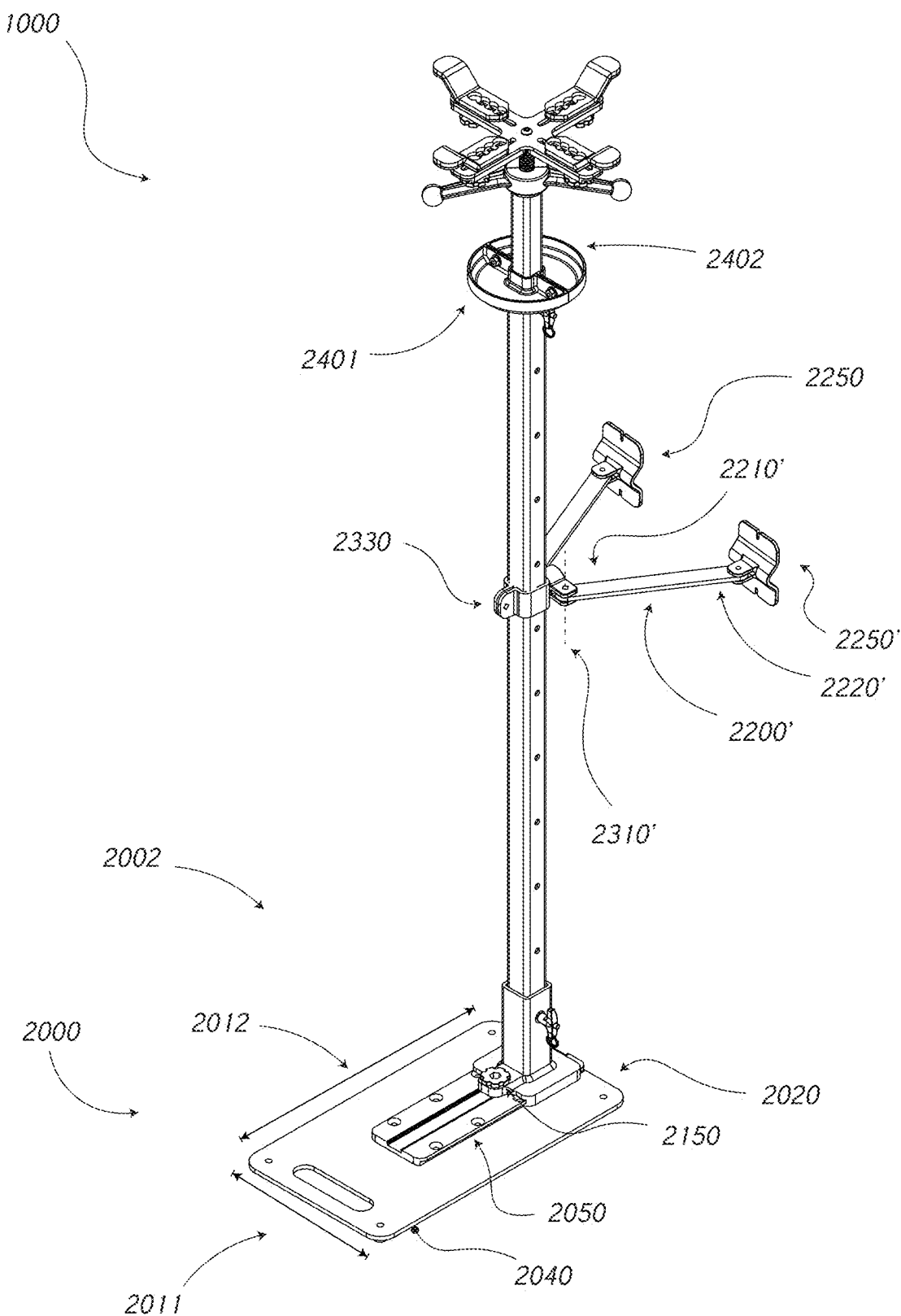
Figure 10A:
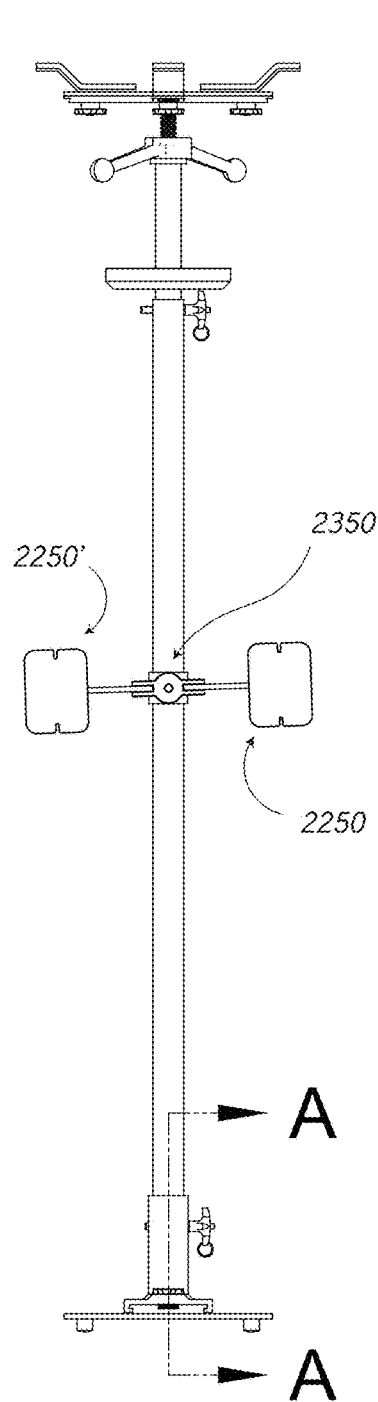
Figure 10B:
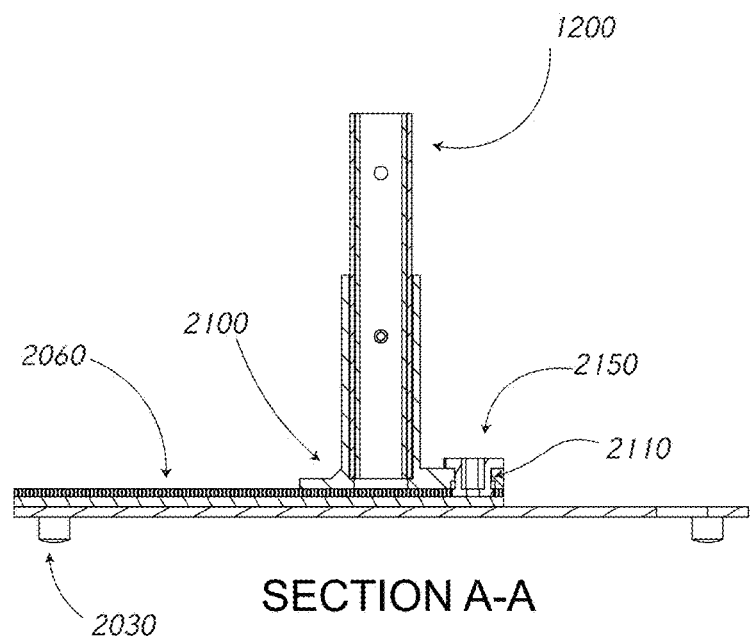
Figure 10C:
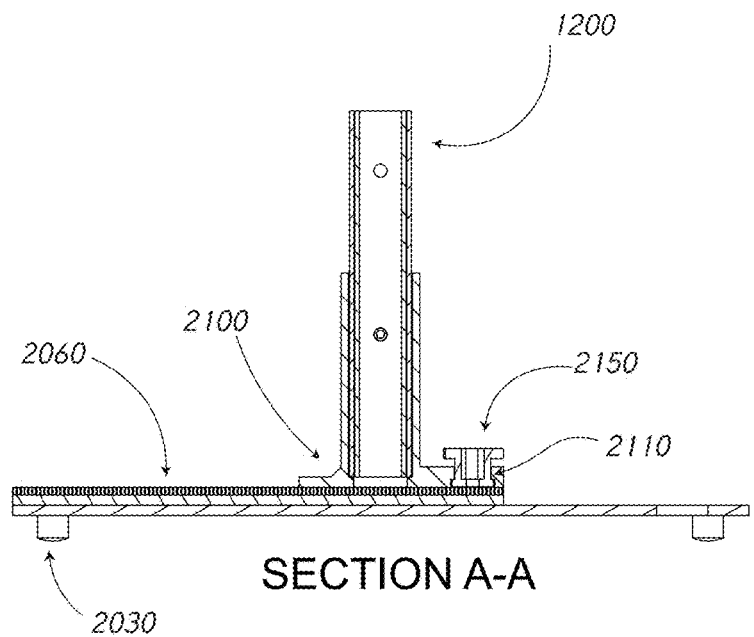
Figure 11A:
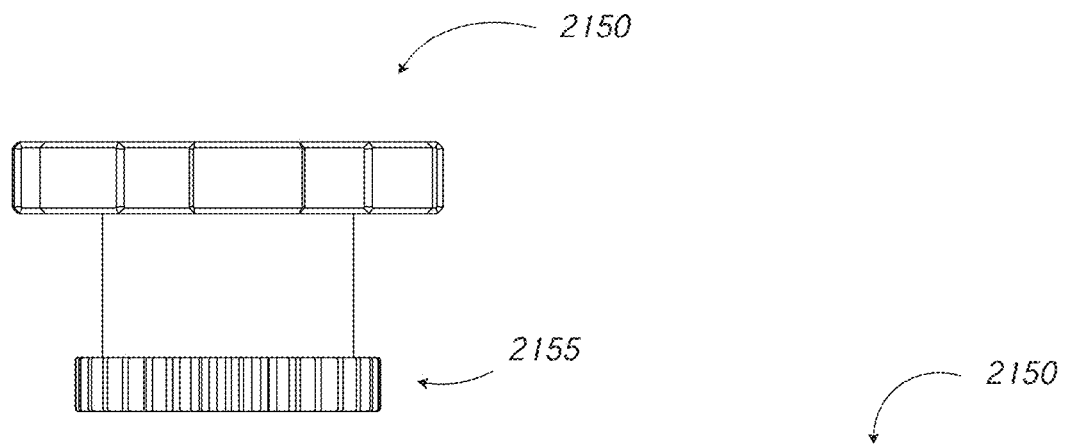
Figure 11B:
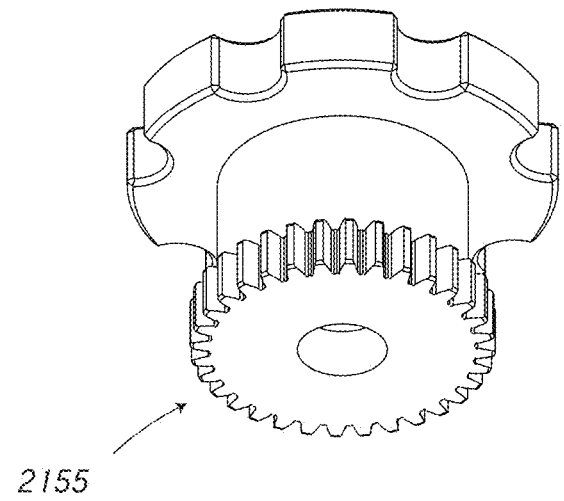
Figure 11C:
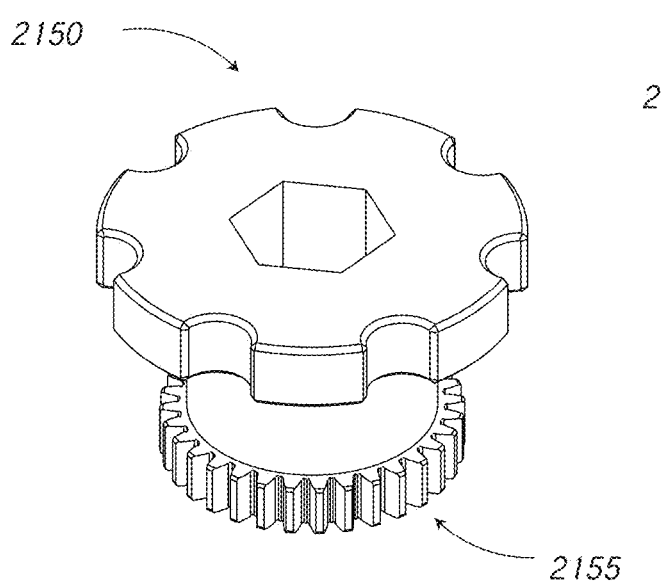

In certain embodiments, the base comprises a base-plate 2000 to which the bottom end 1220 of the mast is interconnected. In a first configuration 2001 as shown in FIG. 9A for example, the mast 1200 is interconnected to a central aspect 2010 of the base-plate, and in a second configuration 2002 as shown in FIG. 9B for example, the mast is interconnected to the base-plate offset from the central aspect 2010, and optionally proximal to a first edge 2020 of the base-plate. When mounted to the central aspect 2010 such as in the first configuration 2001, the apparatus 1000 is adapted for supporting a ceiling mounted object or overhead object (e.g., a ceiling mounted light fixture, ceiling fan, etc.). When the mast is interconnected to the base-plate offset from the central aspect as found in the second configuration 2002, the apparatus is adapted for supporting a wall mounted object (e.g., wall sconce, wall cabinet, etc.).

In certain embodiments, as shown in FIG. 9A-FIG. 10C for instance, the interconnection of the bottom end 1220 of the mast to the base-plate 2000 optionally comprises an adjustable interconnection wherein the interconnection between the bottom end 1220 of the mast and the base-plate 2000 is slidably adjustable. In certain embodiments, as shown, the slidably adjustable interconnection optionally comprises a linear slide 2050 mechanism. However, alternate embodiments optionally comprising a linear slide mechanism, slide rail mechanisms, rack and pinion, a combination thereof, or other mechanisms allowing linear adjustment are within the spirit and scope of the present disclosure.

In certain embodiments, as shown in FIG. 9A-FIG. 10C for instance, the base-plate 2000 optionally comprises feet 2030 interconnected to a bottom surface of the base-plate. In certain embodiments, the base-plate 2000 comprises a non-marring layer 2040 applied to a perimeter of the base-plate.

In certain embodiments the base-plate 2000 is optionally configured to be fully supported on a stair tread such as, but not limited to those having a width of 36 inches wide, and 10 inches deep. In certain embodiments, the base-plate optionally comprises a width 2011 of 10 inches, and a length 2012 of 18 inches.

In certain embodiments, as shown in FIG. 9A-FIG. 11C for example, the slidably adjustable interconnection optionally comprises a linear slide mechanism 2050, a first rack 2060 and a second rack 2060' parallel, or substantially parallel, to the first rack 2060, wherein the teeth of the racks are facing each other. The mast 1200 is configured to be removably interconnected to a carriage 2100 which is interconnected to a linear slide 2050. The carriage comprises a carriage lock 2150 comprising a geared end 2155 which extends through an aperture 2110 of the carriage and is configured to engage with the first rack and the second rack, thereby locking the carriage in place along the linear slide mechanism. When the carriage lock is pulled up, the geared end 2155 disengages from the racks 2060 placing the carriage 2100 in an unlocked configuration (FIG. 10C), and when the carriage lock is pressed down, the geared end 2155 intermeshes with the racks 2060 and prevents the movement of the carriage 2100, placing the carriage 2100 in a locked configuration (FIG. 10B).

Certain embodiments of the present disclosure comprise a first support arm 2200 having a first end 2210 interconnected to the mast 1200, and a second end 2220 extending radially away from the mast 1200 wherein the second end 2220 of the first support arm is adapted to rest upon a first structure or vertical surface (e.g., a wall, bookcase, etc.) to provide additional lateral stability to the overhead support apparatus. The second end 2220 of the first support arm optionally includes an interface member 2250 wherein the interface member optionally comprises a generally planar aspect which is configured to provide an increased surface area for interaction with a wall. In certain embodiments, the interface member 2250 is optionally pivotally interconnected to the second end 2220 of the first support arm to allow the adjustment of the angle of the interface member 2250 in relation to the wall. In certain embodiments, the first support arm 2200 is optionally pivotally interconnected to the mast 1200 providing increased angular adjustability of the angle of the first support arm in relation to the mast and/or the wall. In certain embodiments, the first support arm 2200 is interconnected to the mast via a mounting collar 2300 wherein the first end 2210 of the first support arm is interconnected to the mounting collar 2300, and the mounting collar 2300 is interconnected to the mast 1200. In certain embodiments the mounting collar 2300 is configured to be slidably adjustable longitudinally along the mast 1200 when a clamping aspect 2330 of the mounting collar is loosened, wherein tightening a clamping aspect 2330 of the mounting collar 2300 optionally secures the mounting collar 2300 in place when desired. In certain embodiments, the pivotal interconnection between the first support arm 2200 and the mounting collar 2300 comprises a first axis 2310 of rotation, and a second axis 2320 of rotation to allow further adjustability to the first support arm 2200 in relation to the mast 1200 and to a structure on which the second end if the first support arm is configured to rest upon. In certain embodiments, the first axis 2310 of rotation is orthogonal to the second axis 2320 of rotation.

Certain embodiments of the present disclosure comprise a first support arm 2200 and a second support arm 2200' having their first ends 2210 interconnected to the mast, wherein the second ends 2220 of the support arms extend radially away from the mast 1200 which are configured to rest upon a first structure and a second structure respectively. In certain embodiments the first structure and the second structure are different portions of the same structure. In certain embodiments the support arms 2200 are optionally pivotally interconnected with the mast 1200. In certain embodiments, the support arms 2200 optionally each comprise an interface member 2250 pivotally interconnected to the second ends 2220 of the support arms. In certain embodiments, the first ends 2210 are optionally interconnected to a mounting collar 2300 which is slidably adjustable longitudinally along the mast. In certain embodiments the support arms 2200 are interconnected to the mounting collar 2300, wherein the first support arm 2200 comprises a first axis 2310 of rotation and a second axis 2320 of rotation, and wherein the second support arm 2200' comprises a first axis 2310' of rotation, and a second axis 2320' of rotation. Optionally, in certain embodiments, the second axis 2320 of rotation of the first support arm, and the second axis 2320 of rotation of the second support arm are shared. In certain embodiments the first support arm 2200 and the second support arm 2200' are pivotally interconnected to a spindle 2350 wherein each of the first support arm 2200 and the second support arm 2200' comprise an independent first axis of rotation. The spindle 2350 is pivotally interconnected to the mounting collar 2300 with a second axis 2320 of rotation wherein the first support arm 2200 and the second support arm 2200' rotate about the second axis 2320 in concert.

In certain embodiments, as shown in FIG. 9A-FIG. 10A, a hardware tray 2300 2400 configured to hold tools, hardware, and other items required for mounting of overhead objects is interconnected to the mast 1200. In certain embodiments the hardware tray comprises a first portion 2401 and a second portion 2402 which interconnect to each other around the mast to form a full hardware tray 2400. The hardware tray 2400 of certain embodiments comprises a concave form to prevent items placed therein captive. The hardware tray 2400 of certain embodiments is optionally magnetic to prevent items place therein, particularly ferrous items, captive.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. An overhead support apparatus comprising:
   a base;
   a mast comprising a bottom end interconnected to the base, wherein the mast comprises a telescoping aspect wherein a first segment is interconnected with the base, and a second segment slidably interconnected with the first segment;
   a collar interconnected to a top of the mast, wherein the collar is configured to rotate in relation to the mast;
   a cradle comprising:
      a central hub configured to interconnect with a top of the mast, wherein the central hub comprises a first extension extending in a first radial direction, a second extension extending in a second radial direction, different than the first radial direction, and a third extension extending in a third radial direction, different than the first radial direction and the second radial direction; and
      a plurality of cradle arms extending radially outward and upward from the central hub, including:
         a first cradle arm configured to slidably interconnect with the first extension;
         a second cradle arm configured to slidably interconnect with the second extension; and
         a third cradle arm, configured to slidably interconnect with the first extension,
         wherein the plurality of cradle arms form a recessed aspect adapted for receiving an object therein, and wherein the plurality of the cradle arms are slidably adjustable in the respective radial directions;
   wherein rotating the collar in a first direction extends the cradle upward, and
   wherein rotating the collar in a second direction retracts the cradle downward.

2. The overhead support apparatus of claim 1, further comprising a first support arm;
   a first end of the first support arm is interconnected to the mast; and
   a second end of the first support arm extending radially away from the mast,
   wherein the first support arm is configured to rest upon a first structure to provide lateral stability to the overhead support apparatus.

3. The overhead support apparatus of claim 2, further comprising a second support arm;
   a first end of the second support arm is interconnected to the mast; and
   a second end of the second support arm extending radially away from the mast,
   wherein the second support arm is configured to rest upon a second structure to provide lateral support to the overhead support apparatus.

4. The overhead support apparatus of claim 3, wherein the first support arm and the second support arm are interconnected to a mounting collar, wherein the mounting collar is slidably interconnected to the mast.

5. The overhead support apparatus of claim 4, wherein the mounting collar is interconnected to the first segment of the mast.

6. The overhead support apparatus of claim 4, wherein the mounting collar comprises a clamping aspect, wherein when the clamping aspect is loosened, the mounting collar is slidably adjustable along the mast, and wherein the clamping aspect is tightened, the mounting collar is constrained longitudinally on the mast.

7. The overhead support apparatus of claim 1, wherein the base further comprises a plurality of legs interconnected thereto, wherein the legs are angularly interspaced around the base,
   wherein the legs are configured to be locked in a standing configuration wherein the legs extend radially outward from a central axis to support the overhead support apparatus in an upright orientation and
   wherein the legs are further configured to be locked in a collapsed configuration wherein the legs are constrained parallel to the central axis for ease of transport.

8. The overhead support apparatus of claim 1, wherein the base comprises a base-plate, wherein the bottom end of the mast is interconnected to the base-plate in a central aspect of the base-plate in a first configuration, and
   wherein the bottom end of the mast is interconnected to the base-plate offset away from the central aspect of the base-plate in a second configuration.

9. The overhead support apparatus of claim 8, wherein the interconnection between the bottom end of the mast is slidably interconnected to the base-plate, wherein the mast is slidably adjustable between the first configuration and the second configuration.

10. The overhead support apparatus of claim 9, wherein the slidable interconnection between the mast and the base-plate comprises a carriage configured to interconnect with the bottom end of the mast, and a linear slide interconnected to the base-plate, wherein the carriage is configured to slide along the linear slide.

11. The overhead support apparatus of claim 10, wherein the linear slide further comprises a first rack; and
    a second rack parallel to the first rack, and a carriage lock comprising a geared end configured to intermesh with the racks,
    wherein the geared end is configured to intermesh with the racks thereby locking the carriage to the linear slide.

12. The overhead support apparatus of claim 11, wherein the carriage lock is slidably interconnected with the carriage,
    wherein when the carriage lock is pushed downward, the geared end intermeshes with the racks and places the carriage in a locked configuration, and
    wherein when the carriage lock is pulled up, the geared end disengages from the racks and places the carriage in an unlocked configuration.

13. The overhead support apparatus of claim 8 wherein the base-plate comprises a non-marring layer interconnected with a perimeter of the base-plate; and
    the base-plate further comprises non-slip feet on a bottom surface of the base-plate.

14. The overhead support apparatus of claim 8, wherein the base-plate is configured to fit on a stair tread comprising a depth of at least 10 inches, and a width of at least 18 inches.

15. The overhead support apparatus of claim 8, wherein the base-plate is 10 inches wide, and 18 inches long.

16. The overhead support apparatus of claim 1, further comprising a hardware tray interconnected to the mast, wherein the hardware tray comprises a concave form.

17. The overhead support apparatus of claim 16, wherein the hardware tray comprises a first portion and a second portion configured to interconnect around the mast.

18. The overhead support apparatus of claim 2, wherein the first support arm is pivotally adjustable.

19. The overhead support apparatus of claim 3, wherein the second support arm is pivotally adjustable independent of the first support arm.

\* \* \* \* \*